United States Patent [19]
Barash et al.

[11] 4,209,131
[45] Jun. 24, 1980

[54] COMPUTER-CONTROLLED IRRIGATION SYSTEM

[75] Inventors: Sorin Barash, Petach-Tikva; Yigal Brandman, Ramat-Hasharon; Yitzhak Cohen, Yahud; Shaul Shporn, Doar Petach-Tikva; Joseph Vishnipolsky, Netanya; Elisha Yanai, Giv'at Shmuel, all of Israel

[73] Assignee: Motorola, Inc., Schaumburg, Ill.

[21] Appl. No.: 905,303

[22] Filed: May 12, 1978

[51] Int. Cl.$^2$ ............................................ B05B 12/04
[52] U.S. Cl. ...................................... 239/68; 239/69; 137/624.2
[58] Field of Search ...................... 239/63, 64, 66–72, 239/74; 137/624.18, 624.2; 222/14

[56] References Cited
U.S. PATENT DOCUMENTS

| | | | |
|---|---|---|---|
| 3,529,618 | 9/1970 | Rinkewich | 239/68 X |
| 3,843,056 | 10/1974 | Nye | 239/68 X |
| 3,964,685 | 6/1976 | Chauvigne | 239/68 X |
| 4,015,366 | 4/1977 | Hall | 239/69 |

FOREIGN PATENT DOCUMENTS 868990 1/1953 Fed. Rep. of Germany ............. 239/74

Primary Examiner—Robert W. Saifer
Attorney, Agent, or Firm—Rolland R. Hackbart; James W. Gillman

[57] ABSTRACT

A irrigation system for automatically irrigating an agricultural area having a plurality of fields for producing various crops includes a central station and a plurality of remote stations located in the fields. A computer with associated peripherals in the central station is loaded with an irrigation program defining a predetermined schedule for delivery of pre-established quantities of water to each field, the delivery of water can further be dependent on environmental conditions such as wind speed, temperature, humidity, and other factors. The computer via a communication path, such as a radio channel or three-wire circuit, sends coded command messages to selected remote stations for activating valves and pumps for delivering the pre-established quantities of water to the respective fields and continuously interrogates the remote stations for flow meter, water-pressure meter, environmental conditions and alarm information to diagnose proper operation and to monitor the delivery of water. The irrigation system can equally well control solid-set, pivot sprinklers, or any other suitable sprinkler systems.

30 Claims, 12 Drawing Figures

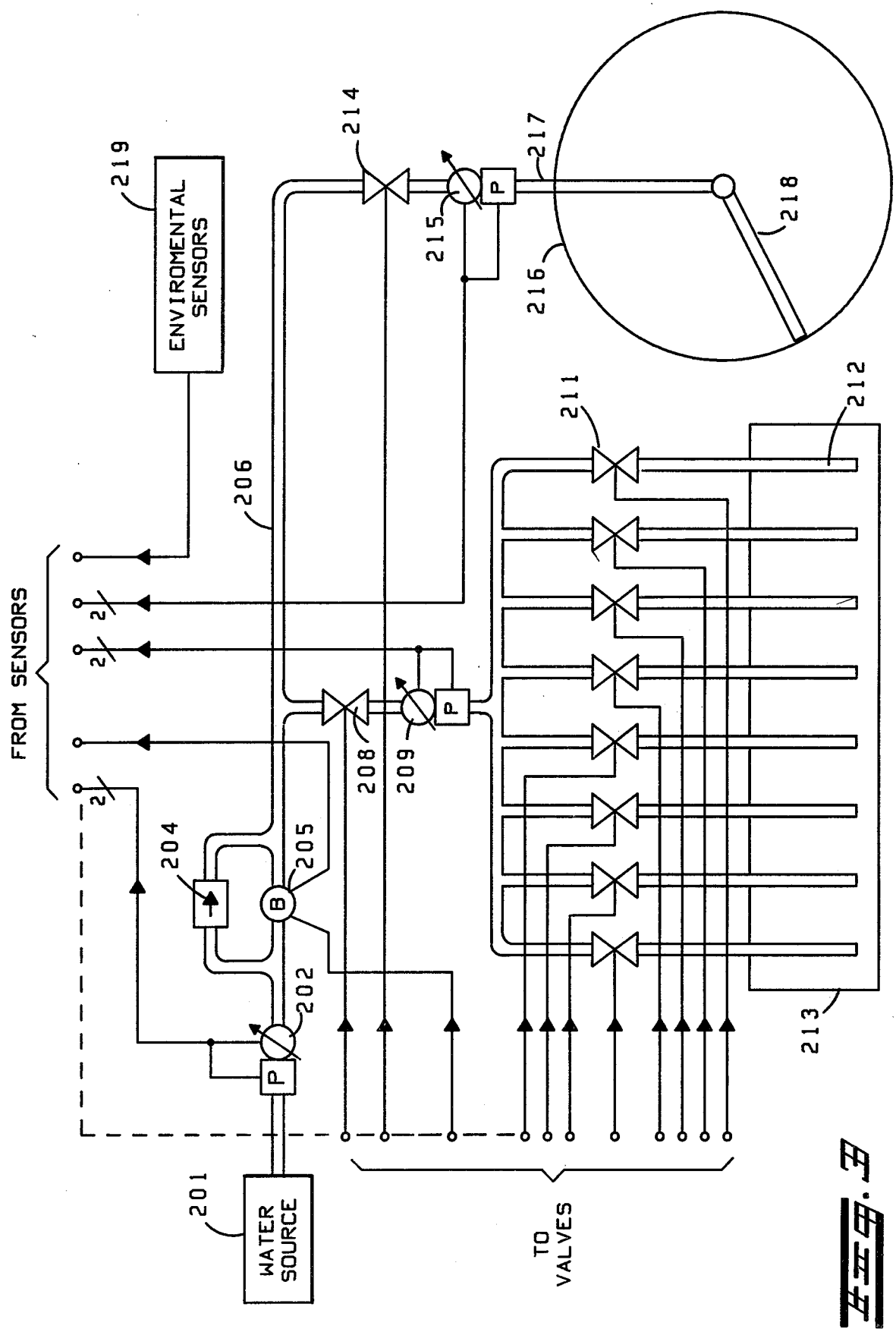

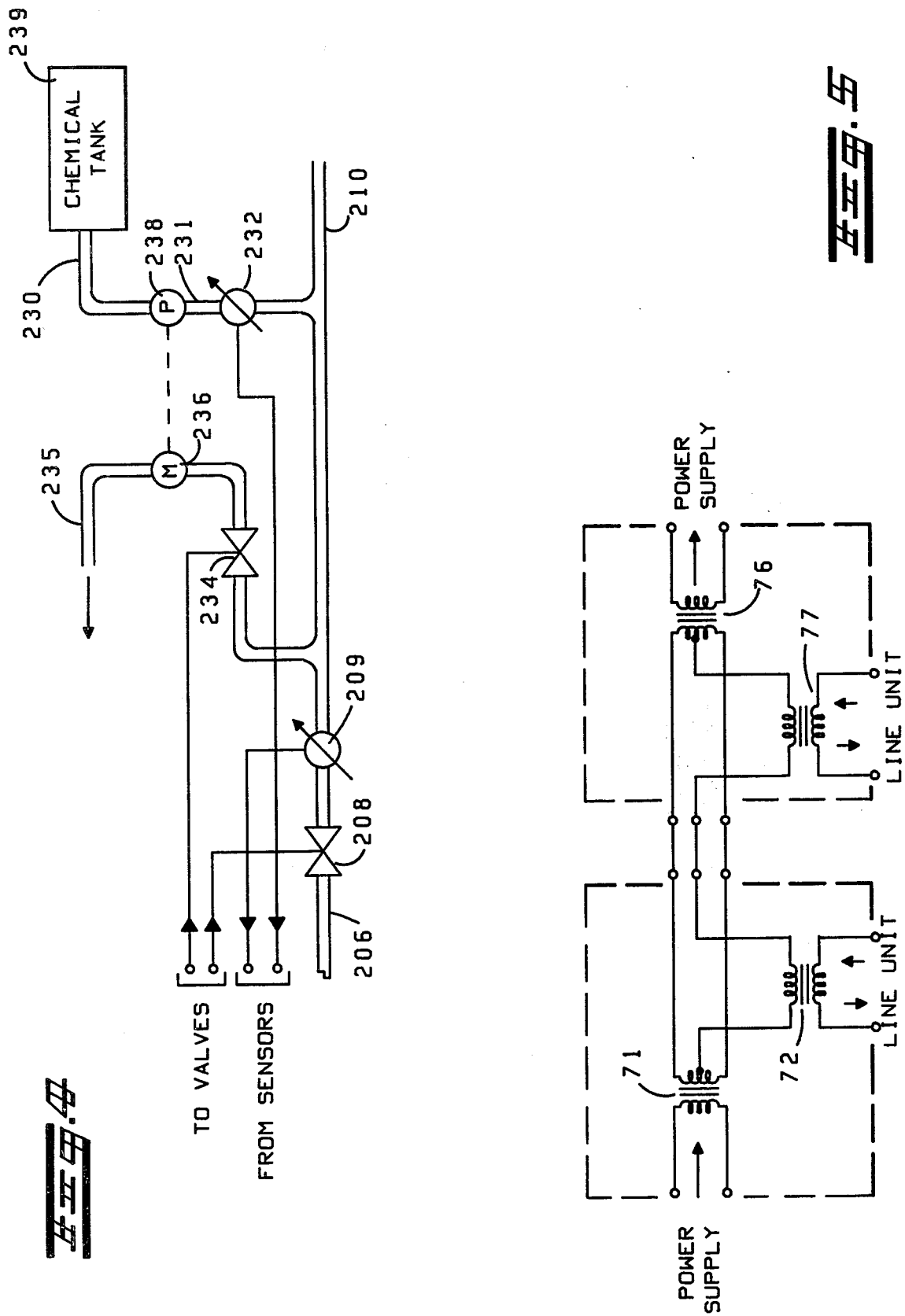

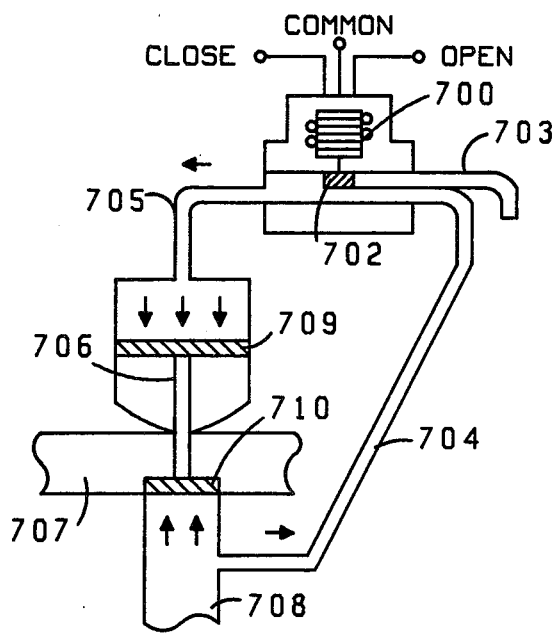
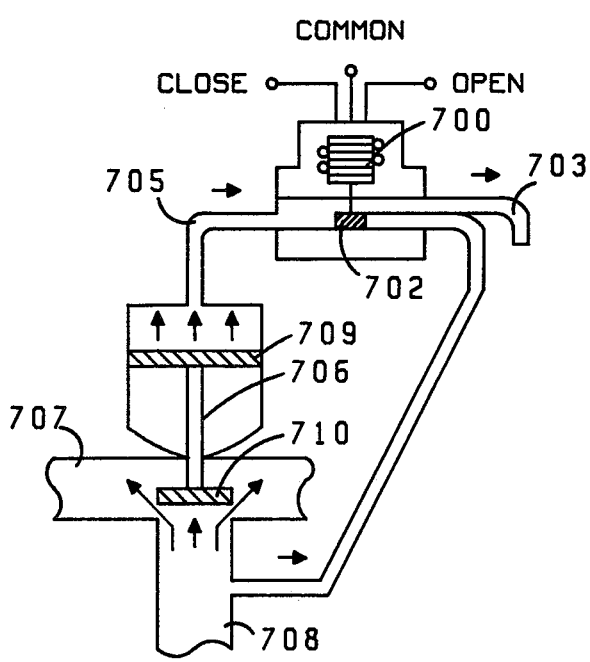
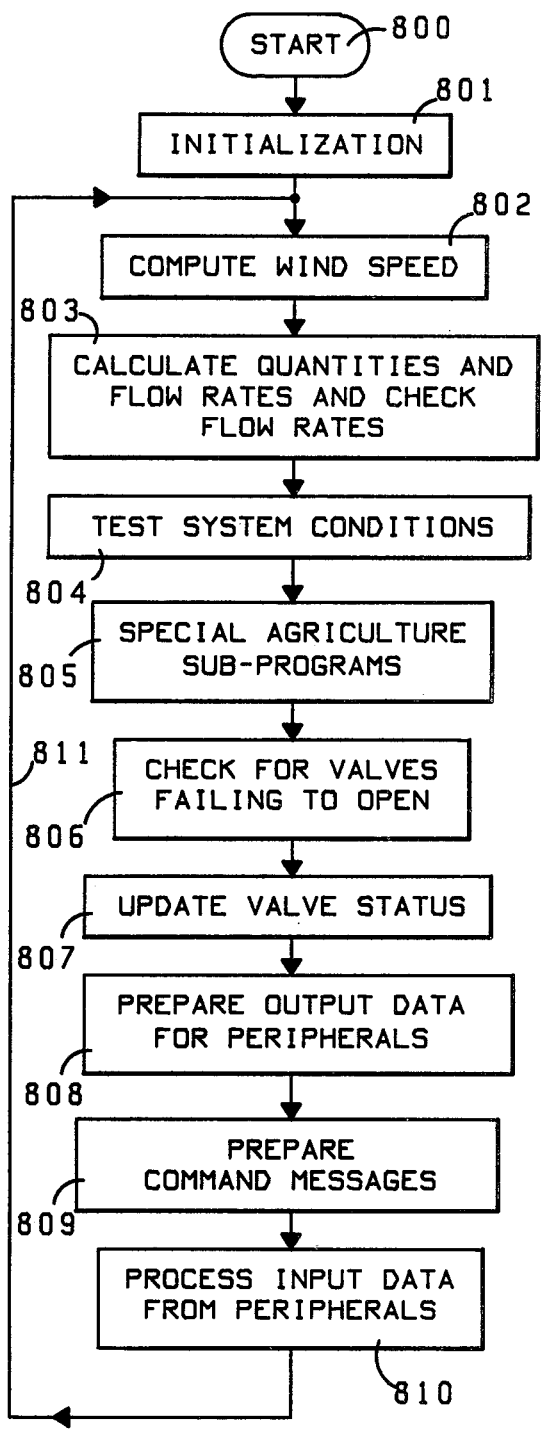

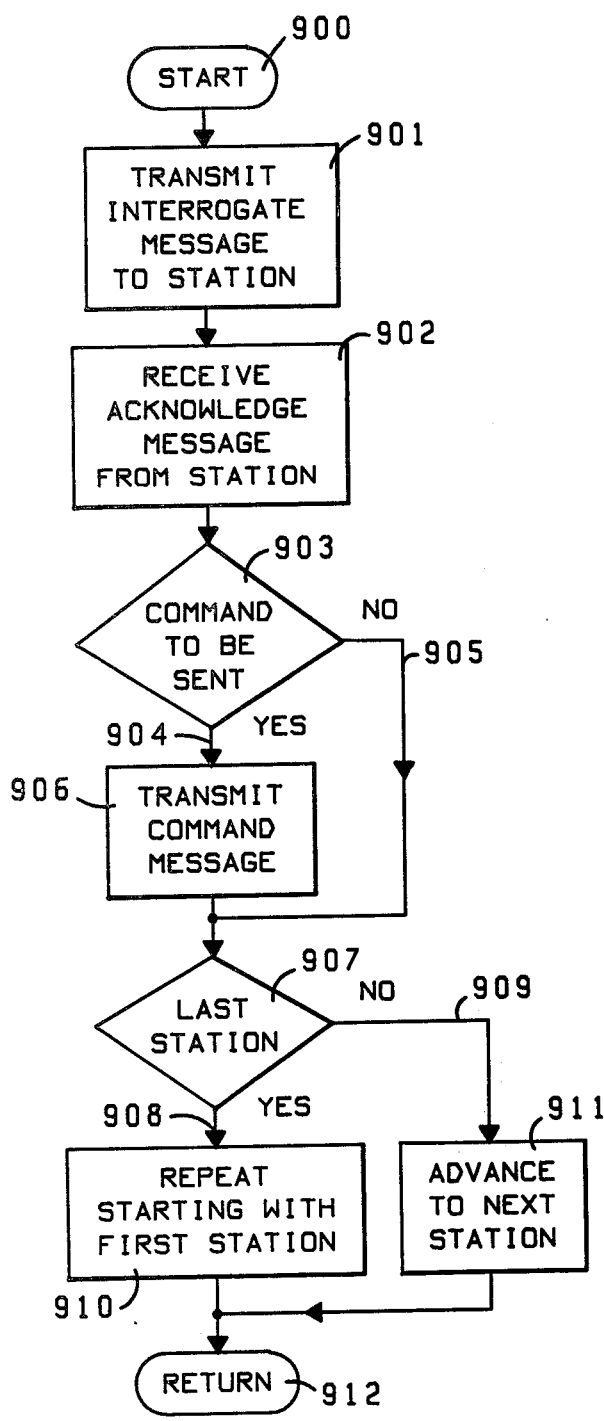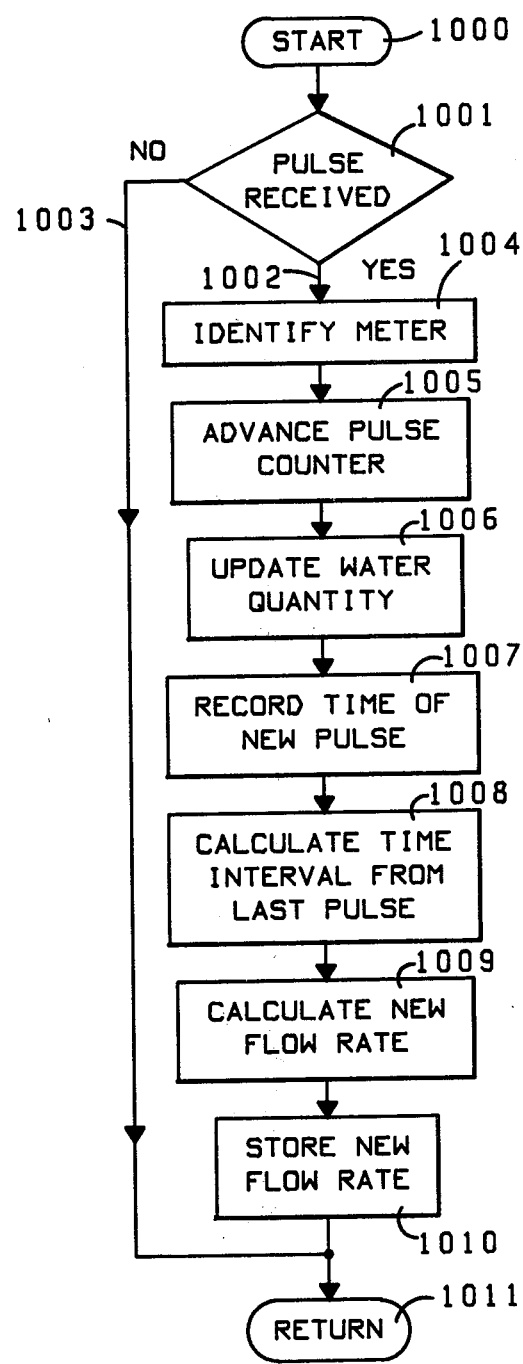
FIG. 9
FIG. 10

COMPUTER-CONTROLLED IRRIGATION SYSTEM

BACKGROUND OF THE INVENTION

1. Field of the Invention

The present invention relates to an irrigation system for an agricultural area, and more particularly, to an improved computer-controlled irrigation system.

2. Description of the Prior Art

In prior-art automatic irrigation systems, an agricultural area is irrigated, for example, once a week for a predetermined time interval. Operating in an open-loop mode does not insure that an exact quantity of water has been delivered to the agricultural area. The same would be true for the distribution of chemicals to the agricultural area in an open loop system.

Other automatic irrigation systems have sensed the moisture level in the soil of the agricultural area and irrigated whenever necessary to maintain a predetermined moisture level in the soil. However, these systems have no way of determining or adequately controlling the quantity of water delivered to the agricultural area and therefore cannot provide the capability of conserving limited water resources. In addition, such a system may fail to provide an adequate amount of water since the moisture level of the soil may be sampled at a place that is not representative of the entire agricultural area. In short, the prior-art automatic irrigation systems do not provide an accounting of the exact amount of water and chemicals that have been distributed. Without the aforementioned accounting, there is no way to determine the history of the irrigation system, or to factor in the availability of water resources.

For the foregoing and other shortcomings and problems, there has been a long felt need for an improved computercontrolled irrigation system.

SUMMARY OF THE INVENTION

It is a general object of the present invention to provide an improved computer-controlled irrigation system that automatically distributes a pre-established quantity of water to an agricultural area.

It is a further object of the present invention to provide an improved computer-controlled irrigation system that automatically controls the irrigation operation to prevent damage to an agricultural area from extreme environmental conditions.

It is a still further object of the present invention to provide an improved computer-controlled irrigation system that automatically diagnoses breaks in the water distributing apparatus to prevent resultant water losses.

It is a still further object of the present invention to provide an improved computer-controlled irrigation system that dynamically optimizes the irrigation operation in response to the ambient environmental conditions in the agricultural area.

It is a still further object of the present invention to provide an improved computer-controlled irrigation system that can be modularly expanded to accommodate additional fields in the agricultural area.

It is yet a further object of the present invention to provide an improved computer-controlled irrigation system that can cycle the irrigation operation to provide a pulse irrigation mode in which the irrigation operation in the fields of the agricultural area is repeated at relatively short time intervals.

In accordance with the present invention, the aforementioned problens and shortcomings of the prior art are overcome and the stated and other objects are attained by an improved system for irrigating an agricultural area that includes means for distributing water to the agricultural area from a water source, main valve means for controlling the flow of water from the water source to the distributing means, main metering means for measuring the quantity of water flowing from the main valve means to the distributing means, and automatic control means for controlling the opening and closing of the main valve means. The automatic control means opens the main valve means to allow water to flow from the water source to the distributing means and closes the main valve means when the distributed quantity of water measured by the main metering means is substantially the same as a pre-established quantity of water for the agricultural area. The operation of the main valve means can be scheduled over a period of time, for example the growing period of a particular crop, to deliver a totalized quantity of water sufficient for production in the agricultural area and also in accordance with the availability of water from the water source. The totalized quantity of water delivered is obtained by totalizing the pre-established quantities of water for each operation of the main valve means.

According to another feature of the present invention, an improved system for irrigating an agricultural area having a plurality of agricultural fields for producing different kinds of crops is provided that includes communication means; a plurality of remote stations, each remote station having control means for receiving via the communication means start and stop messages for controlling the distribution of water from a water source to at least one of the fields, receiving via the communication means interrogate messages, and sending via the communication means in response to each received interrogate message a status message representing the quantity of water that has been distributed since the previously received interrogate message; and a central control station having control means for sending via the communication means the start message to enable selected ones of the remote stations to start distributing water continuously, sending via the communication means the interrogate message for successively enabling selected ones of the remote stations to send the status message, receiving via the communication means the status messages from the selected remote stations, totallizing the distributed quantity of water for each of the selected remote stations as indicated by the corresponding received status messages, and sending via the communication means the stop message to enable ones of the selected remote stations to stop distributing water when the totallized quantity of water distributed by each selected remote station is substantially the same as a preestablished quantity of water for the particular selected remote station. The functions of the control means of the central control station can be provided by means of a computer or microcompuer having a stored program including a plurality of sub-programs for enabling the computer to provide the various functions and features.

Additional features, objects and advantages of the computer-controlled irrigation system in accordance with the present invention will be more clearly apprehended from the following detailed description together with the accompanying drawings.

BRIEF DESCRIPTION OF THE DRAWINGS

FIG. 3 shows a block diagram of a water distributing system for a remote station.

FIG. 4 shows a block diagram of a chemical distributing system for a remote station.

FIG. 5 shows a circuit diagram of the three-wire circuit between the lihne unit of the central station and the line unit of the remote station of FIG. 1.

FIGS. 6 and 7 show the open and closed conditions, respectively, of the solenoid-activated hydraulic valve in the remote station of FIG. 1.

FIG. 8 is a flow chart of the main irrigation program for the computer of the central control station in FIG. 1.

FIG. 9 is a flow chart of the communication program for the computer of the central control station in FIG. 1.

FIG. 10 is a flow chart of the flow rate sub-program for the computer of the central control station of FIG. 1.

DESCRIPTION OF THE PREFERRED EMBODIMENT

Figure 1:
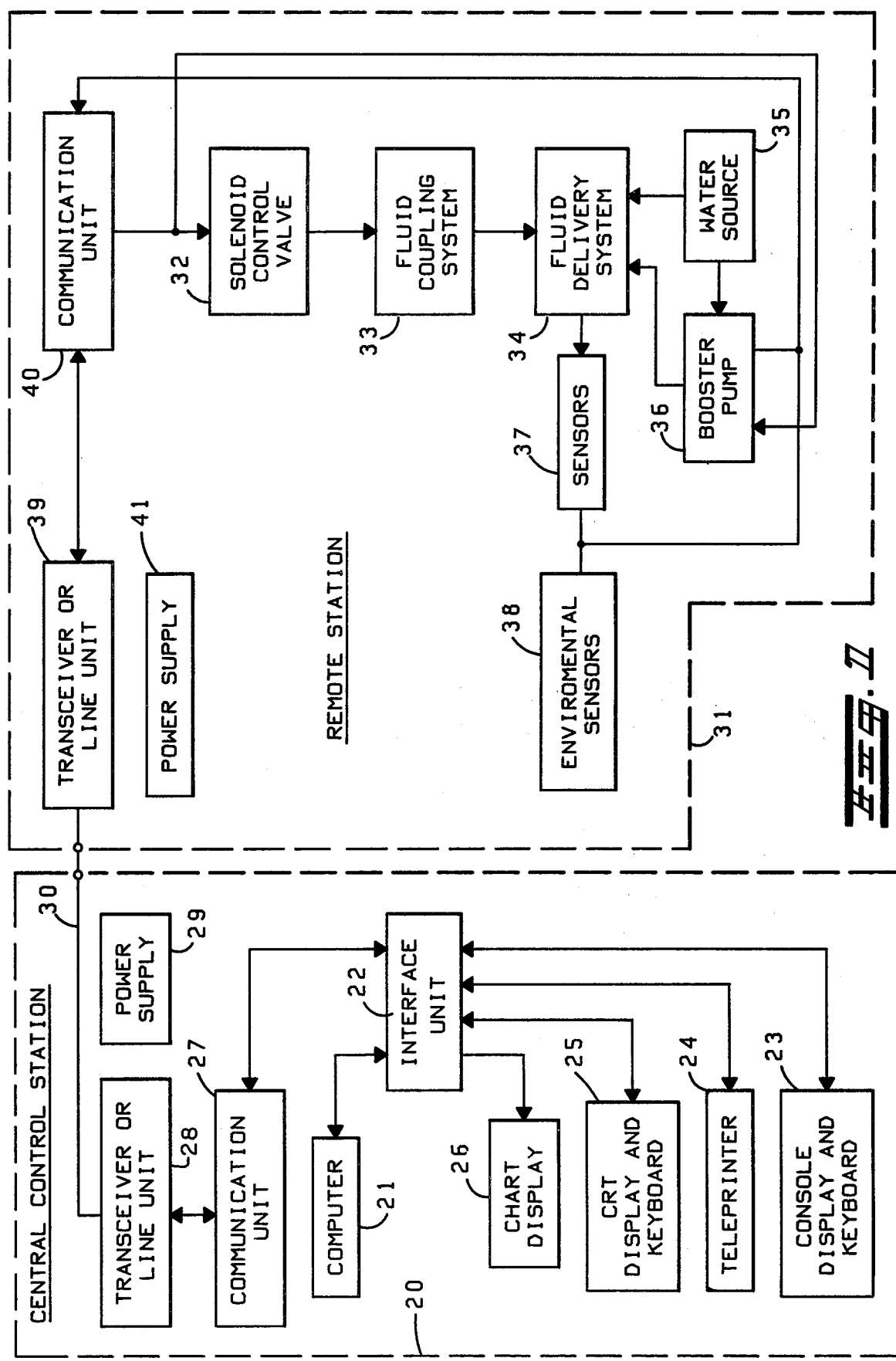
FIG. 1 shows a functional black diagram of a computercontrolled irrigation system embodying the present invention.

Referring to FIG. 1, a computer-controlled irrigation system embodying the present invention is shown that includes a central control station 20 and a plurality of remote stations 31. The computer-controlled irrigation system provides for the irrigation of an agricultural area including a plurality of fields for producing various crops. The central control station 20 is coupled to the various remote stations 31 by means of communication path 30. The communication path 30 may be a duplex radio channel or a wire line and provides for communication of coded messages between the central control station 20 and the remote station 31. The central control station 20 controls and monitors the irrigation operation in the various remote station 31 by means of coded messages via the communications path 30. The central control station 20 utilizes the feed-back information provided from the remote stations 31 to insure that the irrigation operation delivers pre-established quantities of water to each of the various fields.

The central control station 20 includes a computer or microcomputer 21 having a stored program for controlling the irrigation operation of the various remote stations 31. The computer 21 may be any of a number of commercially available computers or microcomputers such as the Motorola M6800 microcomputer system, which is described in the publication, "M6800 Microcomputer System Design Data," by Motorola, Inc., 1976 and in U.S. Pat. No. 4,030,079 entitled "Processor Including Incrementor and Program Register Structure," by Thomas H. Bennett et al, filed on June 14, 1977 and assigned to Motorola, Inc.

The computer 21 is coupled by interface unit 22 to communication unit 27 and the various peripheral units, the chart display 26, the CRT display and keyboard 25, the teleprinter 24, and the console display and keyboard 23. The console display and keyboard 23 includes a digital display and a keyboard for entering or modifying parameters stored in the computer 21. The digital display of the console display and keyboard 23 provides a visual display of parameters entered into or read out of the computer 21. The teleprinter 24 provides for the printing out of both status and alarm messages from the computer 21. The teleprinter 24 can also be utilized for loading the stored program in the computer 21. The CRT display and keyboard 25 can be alternately used to replace the console display and keyboard 23. The chart display 26 provides a scaled geographical representation of the agricultural area detailing the particular lay-out of the irrigation system. The lay-out includes, for example, the various remote stations and the associated water pipes and valves located in the corresponding fields. In addition, the lay-out includes visual indicators for showing which valves are currently opened or closed and the status of the irrigation operation for the particular valves. For example, four indicator lights may be provided for each valve, a yellow light indicating that the valve is standing by for its turn in a currently running irrigation program, a first green light indicating that the valve is open and water is flowing through the valve, a second green light indicating that operation of the valve is complete, and a red light indicating a failure of the valve.

The communication unit 27 receives data from the computer 21 by way of the interface unit 22 and codes the data for transmission over the communication path 30. In the preferred embodiment, the communication unit 27 is a frequency-shift-keying (FSK) transmitter and receiver. Messages are coded into 32 bit data words by the communication unit 27 and applied to the transceiver or wire line unit 28 for transmission over the communication path 30. The communication unit 27 and transceiver or line unit 28 may be provided by apparatus similar to that described in co-pending application Ser. No. 807,850 by Cohen et al, entitled "Supervisory Control System", filed on June 20, 1977 and assigned to the instant assignee, which has subsequently matured into U.S. Pat. No. 4,161,718. The communication unit 27 transmits command messages from the computer 21 and receives status messages from the remote stations 31.

The communication path 30 may be either a duplex radio channel or a wire line circuit. The transmission of data over the communication path 30 is more fully described in the above referenced application Ser. No. 807,850 by Cohen et al. If a wire line is used, all the remote stations 31 are connected in parallel to a three-wire circuit as further illustrated in FIG. 5. The three-wire circuit couples AC power to the remote stations 31 in addition to the FSK coded messages. The transceiver or line unit 28 and power supply 29 are coupled to the three-wire circuit in the central control station 20 and the transceiver or line unit 39 and power supply 41 are coupled to the three-wire circuit 30 in the remote station 31.

Referring to FIG. 5, the three-wire circuit 30 is more clearly shown where transformer 71 is coupled to power supply 29 and transformer 72 is coupled to line unit 28, transformer 76 is coupled to power supply 41 and transformer 77 is coupled to line unit 39. The FSK messages introduced through transformers 72 and 77 are longitudinally balanced with respect to transformers 71 and 76. The longitudinal balance is achieved by coupling one side of transformers 72 and 77 to the center tap of transformers 71 and 76, respectively. Longitudinal balance insures that the AC power carried by the three-wire circuit does not interfere with the transmission of FSK messages between the central control station 20 and remote station 31.

Referring back to FIG. 1, the remote station 31 controls the irrigation for and is located in or near one or more adjacent fields. The transceiver or line unit 39 receives command messages from the central control station 20 via the communication path 30. If communication path 30 is a three-wire circuit, AC power is also received from the three-wire circuit. In systems which include a transceiver in 28 and 29 of FIG. 1 instead of a line unit, the power to the remote station is obtained from a local source, such as, for example, local AC means or batteries. The command messages are coupled by transceiver or line unit 39 to communication unit 40 for decoding. The communication unit 40 decodes the command messages and appropriately activates solenoid-controlled hydraulic valves 32 or the booster pump 36.

The solenoid-controlled hydraulic valves 32 are connected to the fluid delivery system 34 by means of a fluid coupling system 33. The fluid delivery system 34 distributes water from the water source 35 to the particular field or fields. The booster pump 36 may be enabled if the water pressure from the water source 35 is inadequate for proper distribution of the water by the fluid delivery system 34.

The fluid delivery system 34 includes water pipes, valves and sprinklers for distribution of water over the particular fields. Sensors 37 are coupled to the fluid delivery system 34 for measuring the water pressure from the water source 35 and for measuring the flow of water in the various valves. Outputs from the sensors 37, the environmental sensors 38 and the booster pump 36 are coupled to the communication unit 40 for transmission in status messages to the central control station 20.

Figure 2:
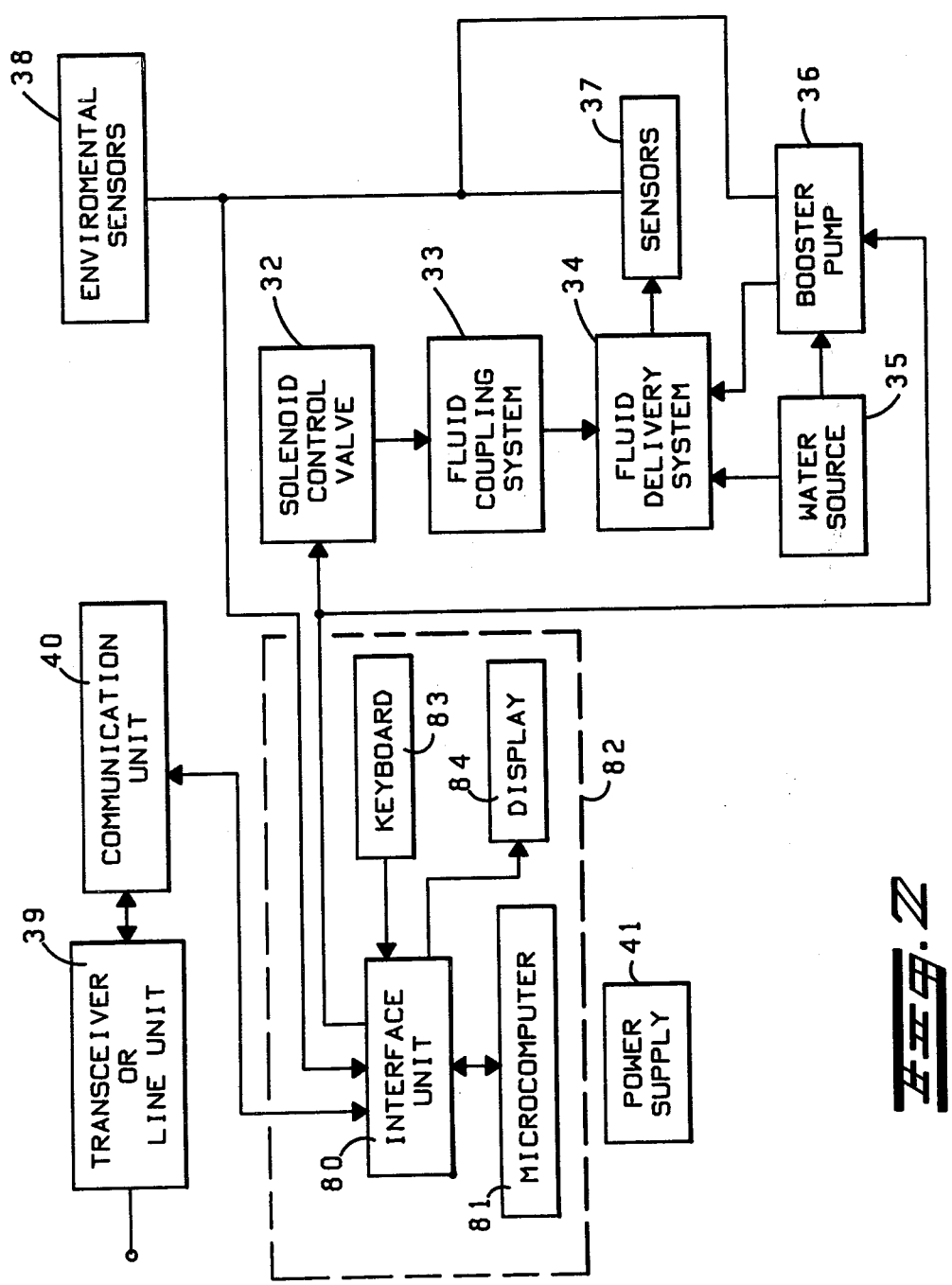
FIG. 2 shows a functional block diagram of a computercontrolled remote station.

Referring to FIG. 2, the remote station may be provided with a microcomputer 81 having a stored program for controlling the irrigation of an agricultural area having a plurality of fields. Command messages are coupled from the communication unit 40 to the microcomputer 81 by the interface unit 80. The microcomputer 81 is responsive to the command messages from the central control station for controlling the irrigation of the respective fields. The microcomputer 81 activates the solenoid-controlled hydraulic valves 32 and the booster pump 36 by way of the interface unit 80. Outputs from the environmental sensors 38, the fluid delivery sensors 37 and the booster pump 36 are coupled to the microcomputer 81 by the interface unit 80. The microcompuer 81 reports the outputs from the sensors and the status of the irrigation of the operation by way of the interface unit 80 to the communication unit 40 for transmission to the central control station 20. The microcomputer 81 may also be associated peripheral units, a keyboard 83 and a display 84. The keyboard 83 may be used to enter parameters into the microcompuer 81 relating to the irrigation operation. The display 84 provides for an indication of the status of the irrigation operation in the agricultural area.

Referring, to FIG. 3, the water distributing system for a remote station controlling the irrigation of two fields is shown. One field 213 is irrigated by solid-set sprinkler system, while the other 216 is irrigated by a pivot sprinkler system. A solid-set sprinkler stream may be any of a number of pressurized systems including drip, gum, tow-line, handmove and traveller systems. For example, a solid-set sprinkler system may include eight water pipes 212 are having sprinklers spaced along them. A pivot sprinkler system consists essentially of a radial pipe 218 having sprinklers spaced along it radial pipe 218 being mounted wheels and driven such that it may rotate through a full 360°. Pivot and solid-set sprinkler systems are typically utilized to irrigate a field which covers 160 acres or one-quarter of a section. An irrigation system in accordance with the present invention may be configured to control a plurality of fields of which some have solid-set sprinkler systems and others have pivot sprinkler systems.

Water source 21 is coupled by a pipe to pressure, which are actually separate devices, and flow meters 202. Pressure meter and flow meters 202 provides an indication of the water pressure and also provides an output pulse for each predetermined quantity of water, for example, 10 gallons, that flows pass the meter. The pressure and flow meters 202 are coupled by pipes to booster pump 205 and to a unidirectional valve 204. The booster pump 205 is activated in response to an indication from pressure and flow meters 202 that the water pressure is less than a predetermined water pressure. Otherwise, water flows by way of uni-directional valve 204 to a main water pipe 206.

Water from the water source 201 is carried by a main water pipe 206 to main valves 208 and 214. Main valves 208 feeds the solid-set sprinkler system of field 213, while main valve 214 feeds the pivot sprinkler system of field 216. Main valves 208 and 214 are coupled to pressure and flow meters 209 and 215, respectively.

Main valve 208 is coupled to a number of secondary water pipes 212 which each have a secondary valve 211. After the main valve 208 is opened, water may be directed to the secondary water pipes individually by opening the corresponding secondary valve or may be directed to groups of secondary water pipes 212 or to all of the secondary water pipes 212. Although not necessary for the operation of the irrigation system, additional pressure and flow meters may be provided in each of the secondary water pipes 212 following the corresponding secondary valves 211.

Main valve 214 is coupled to a secondary pipe 217 for providing water to the radial pipe 218 of the pivot sprinkler system of field 216.

The pressure and flow meters 202, 209 and 215 provide separate outputs for the sensed pressure and the sensed quantity of water flowing past the meters. For example, a pressure output may be provided by a pressure sensor that closes or opens a relay contact in response to water pressure that exceeds a predetermined pressure. Suitable pressure sensors of this type are commercially available from a number of sources. Another type of pressure sensor may be utilized that provides an output voltage which is directly proportional to the water pressure. A suitable converter may be provided that converts the output voltage of the pressure sensor to a pulse train, whose frequency is directly proportional to the output voltage. The pulse train is further coupled to the coil of a relay to enable the momentary closing of the relay contacts in response to each pulse of the pulse train.

The pressure and flow meters 202, 209 and 215 also provide an indication of the quantity of water flowing past the meters. A momentary pulse for each predetermined quantity of water that flows through the pressure and flow meter is provided by converting each full rotation of a water quantity meter into a single pulse. This can be accomplished by attaching a radial arm to the shaft of the water quantity meter. A magnet is placed at the end of the radial arm, and a pair of reed contacts are fixedly attached to the water quantity meter such that each time the radial arm is aligned with the reed contacts, the reed contacts close momentarily. Thus each rotation of the shaft is converted into a momentary closing of the reed contacts when the radial arm passes over the read relay. Also, each momentary closing of the reed contacts corresponds to one complete revolution of the water quantity meter indicating that a predetermined quantity of water, for example, 10 gallons, has flowed past the meter.

The momentary closings of the reed contacts from the pressure, and flow meter are coupled to the communication unit 40 (see FIG. 1) of the remote station 41 for transmission to the central control station 20. In addition, environmental sensors 219, which likewise may provide closings of relay contacts in response to pre-established environmental conditions, are coupled to the communication unit 40 (see FIG. 1) for transmission to the central control station 20. For example, an environmental sensor 219 for sensing a predetermined minimum temperature may provide the closing of relay contacts when the ambient temperature and the agricultural area is less than the predetermined minimum temperature.

Referring to FIGS. 6 and 7, a solenoid-controlled hydraulic valve is shown in the closed condition in FIG. 6 and the open condition in FIG. 7. The control of such a valve which may be remotely located in the agricultural area requires a substantial amount of power. The piston 706 which opens to allow water to flow from water pipe 708 to water pipe 707 is relatively heavy and must work against hydro-static pressures of several atmospheres. The solenoidcontrolled hydraulic valve utilizes the water pressures of the water distributing system to operate the piston 706. The use of hydraulic valves and remote control interconnected to the hydraulic valves by water hoses not only conserves electricity but also provides more reliable operation.

For the closed condition of FIG. 6, water from water pipe 708 is coupled by hose 704 through solenoid valve 700 to hose 705 and exerts pressure on the top surface 709 of piston 706. Since the area of the top surface 809 of the piston 706 is greater than the area of the bottom surface 710, a greater force is applied to the top surface 709 that the bottom surface 710 causing the piston 706 to close water pipe 708.

Referring to FIG. 7, the open condition is provided by applying an open-pulse to solenoid valve 700 which causes piston 702 to block hose 704. When hose 704 is blocked, a force is no longer applied to top surface 709 of piston 706. The force on the bottom surface 710 causes the piston 706 to open the water pipe 708 to allow water to flow to water pipe 707. The top surface 709 of piston 706 causes water to be expelled through hose 705 and solenoid valve 700 to hose 703. The piston 706 may be returned to the closed condition of FIG. 6 by application of a close-pulse to the solenoid valve 700, which causes piston 702 to open hose 704 and block hose 703.

Referring to FIG. 4, chemical application apparatus for use in applying fertilizer or pesticides via the water distributing system of FIG. 3 is shown. The fertilization apparatus may be placed, for example, in the water pipe immediately following secondary valve 208 (see FIG. 3) such that the chemicals from the chemical tank 239 are directed only to field 213. Likewise, the fertilization apparatus may be placed in water pipe 206 immediately following booster pump 205 such that chemicals from the chemical tank 239 may be applied to either field 213 or field 216.

To initiate a cycle during which chemicals, such as fertilizers, are applied to a field, valve 208 is opened by a command message from the central control station. Water then flows from water pipe 206 to water pipe 210. After a predetermined time interval, valve 234 is opened by a command message from the central control station. Water then flows to hydraulic or electric motor 236 which is mechanically coupled to pump 238. After passing through hydraulic pump 236, water is expelled by way of pipe 235. Pump 238 draws chemicals from the chemical tank 239 and injects the chemicals into water pipe 210 at relatively high pressure. The injected chemicals throughly mix with the water flowing in water pipe 210 to form an even concentration before application to the particular agricultural area. The quantity of chemical applied is measured by flow meter 232. When a pre-established quantity of chemical has flowed past the flow meter 232 as determined by the central control station, valve 234 is closed to terminate the chemical-application cycle. In addition, valve 208 is kept opened for at least a predetermined time interval after the chemical-application cycle has been terminated in order to flush the chemicals from the water distributing system. Flushing the chemicals from the water distributing system prevents chemical damage to the water distributing system and the crops. In some cases, for example, for the application of pesticides, flushing may be eliminated from the chemical-application cycle since it is desired that the chemicals remain on the crops.

Monitoring the chemical-application cycle is accomplished by means of the flow meter 232 and insures that a preestablished quantity of chemical is delivered to the agricultural area. The chemical is uniformly injected into the water pipe 210 where the chemical is thoroughly mixed with the water flowing in the water pipe 210 before application to the agricultural area. The chemical-application apparatus of FIG. 4 enables the computer-controlled irrigation system of the present invention to automatically dispense exact quantities of chemical to an agricultural area.

The control functions of the central control station may be provided by a computer having a stored program. The stored program of the computer provides all the functions necessary for the irrigation operation. The computer of the central control station may be any of a number of commericially available computers or microcomputers, such as the Motorola M6800 microcomputer system. Programming of the M6800 microcomputer system is described in "M6800 Programming Reference Manual," by Motorola, Inc., 1976.

The stored program of the computer-controlled irrigation system of the present invention is designed for controlling two primary operations, the irrigation operation of the remote stations and the communications between the central control station and the remote stations. The main irrigation program of FIG. 8 together with a number of sub-programs controls the irrigation operation of the remote stations. The communication program of FIG. 9 provides for the communication of messages between the central control station and the remote stations. The messages transmitted between the central control station and the remote stations are organized and coded according to the signalling format described in the aforementioned U.S. patent application, Ser. No. 807,850, by Cohen et al.

The majority of the processing time of the computer of the central control station is spent in the main irrigation program, being interrupted at periodic intervals for the processing of the communication program. Referring to FIG. 8, the main irrigation program is entered at start box 800 and proceeds to the initialization box 801. During program initialization, the specific field connections and configuration of the water distributing system are entered. For example, the structure of the agricultural area is defined in terms of the number of valves, sensors and pumps and the various interconnections between these elements. Matrices or tables are set up in the memory of the computer for the foregoing information. An interactive program is provided which prompts and directs an operator as to the entry, by way of a keyboard (see FIG. 1), of the necessary information for defining the field connections for the particular agricultural area.

Once the necessary field configuration and parameters have been entered into the main irrigation program, the program proceeds to box 802 and commences the irrigation operation. In box 802, the wind speed is calculated from information received from the wind speed sensor at the remote station. Proceeding to box 803, flow rates are calculated for each valve at the remote stations from the present quantity indication received and the time since the last received quantity indication. The quantity indications are totalized for each valve at the remote stations. The calculated flow rates and totalized quantities are compared with pre-established parameters for each of the valves in the water distributing system. When the totalized quantity of water for a valve is substantially the same as the preestablished quantity of water for the valve, a command message to close the valve is prepared for transmission. The calculated flow rates are utilized to diagnose failures occurring in the valves. For example, a flow rate that is higher than a pre-established flow rate for a valve provides an indication of a broken water pipe or a broken sprinkler. Flow rates that are less than a preestablished minimum flow rate for a valve indicate a blockage in a water pipe or sprinkler. Flow rates for a valve that are substantially zero indicate the valve that has failed to open. In addition, a calculated flow rate for a valve which is supposed to be closed indicates a malfunction where the valve has spontaneously opened. Thus, calculation of the flow rate for each of the valves is a very important feature of the computer-controlled irrigation system of the present invention that provides for automatic diagnosis of malfunctions in the water distributing system.

Proceeding to box 804, system conditions, for example, environmental conditions and conditions dependent on time schedules or operations of related valves, are checked and appropriate action is taken. The irrigation operation of particular valves may be initiated at particular times. For example, it may be desirable to irrigate a field having a particular crop only during the night time hours. In addition, the opening of particular valves may be made dependent on the opening of another valve. The environmental conditions in the particular fields may necessitate the interruption of the irrigation operation until the particular environmental condition has disappeared. For example, high winds will result in excessive evaporation of the water that is being applied to the fields. The irrigation operation may be halted until the wind subsides and then started again. Also, temperature conditions in the agricultural area may necessitate termination or initiation of the irrigation cycle. For example, it is preferable to irrigate during the cooler part of the day to prevent frost. Thus, irrigation operation may be halted when the ambient temperature rises above a predetermined maximum temperature and started again when the ambient temperature drops or vice versa. Likewise, irrigation operation may be started to prevent cold temperature damage to the crops in the fields when the ambient temperature is less than a predetermined minimum temperature.

Proceeding to box 805, special agricultural sub-programs, are executed next. The special agricultural sub-programs provide for a number of options, including the operation of booster pumps, preparation of bookkeeping data for the irrigation operation, the application of chemicals to the fields, the determination of the requisite quantities of water for the next irrigation operation, and the determination of the time of the next irrigation operation based on environmental conditions. In addition, special sub-programs may be provided for tailoring the irrigation operation to the needs of the growing cycle for a particular crop.

Proceeding to box 806, a check is made to verify that water is flowing in all valves that have been commanded to open. If a valve has failed to open, the flow rate for the particular valve will be substantially zero. A second command message may then be provided to open the unresponsive valve a second time, since the first command message may not have been received due to interferenee. In addition, an alarm message is printed by the teleprinter that the particular valve has failed to open. If the unresponsive valve fails to open after the second command message, the valve may be considered to be faulty and scheduled for repair.

Proceeding to box 808, data is adapted to the particular format necessary for the peripheral units. The status of the irrigation operation is outputted to the chart display for visual monitoring. Various messages as to the status of the irrigation operation is directed to the teleprinter. For example, the start, stop and flow rates of each valve and the corresponding time of the operations may be printed by the teleprinter. Likewise, any detected malfunction in the valves may also be printed by the teleprinter.

Proceeding to box 809, command messages for controlling the irrigation operation are prepared and formatted into the 32 bit format for transmission by the communication program.

Proceeding to box 810, input requests received from the various peripheral units are processed and appropriate action is taken. Path 811 is then taken back to box 802 and the foregoing is repeated.

Referring to FIG. 9, the communication program is entered at start box 900 and proceeds to box 901 where interrogate messages are transmitted to the remote stations. Each of the remote stations is interrogated in succession. Once the last remote stations has been interrogated, the cycle is started again with the first.

Proceeding to box 902, the acknowledge message from the interrogated remote station is received. A time interval sufficient for reception and transmission of the status message by the remote station is allowed before proceeding to the next box in the communication program. The received status message provides an indication of the status of the various sensors at each of the remote stations. The received status for each remote station is stored in corresponding tables of the computer memory.

Proceeding to decision box 903, a check is made to see if any command messages are to be sent. If command messages, previously prepared for transmission to the remote stations by the main irrigation program, are to be sent, YES branch 904 is taken to box 906 where the command messages are transmitted to the remote stations. Otherwise, NO branch 905 is taken to the decision box 907.

Decision box 907 checks to see if the last remote station has been interrogated. If the last remote station has not been interrogated, no branch 909 is taken to box 911 where the communication program is indexed to the next remote station. Otherwise, YES branch 908 is taken to box 910 where the communication program is indexed back to the first remote station for repeating the interrogation cycle. Proceeding from boxes 910 and 911, the communication program proceeds to return box 912. From return box 912 operation of the computer is returned to the main irrigation program. The communication program is re-entered by an interrupt in response to receipt of a status message or at the expiration of a predetermined time interval when the next remote station is to be interrogated.

Figures 11, 12:
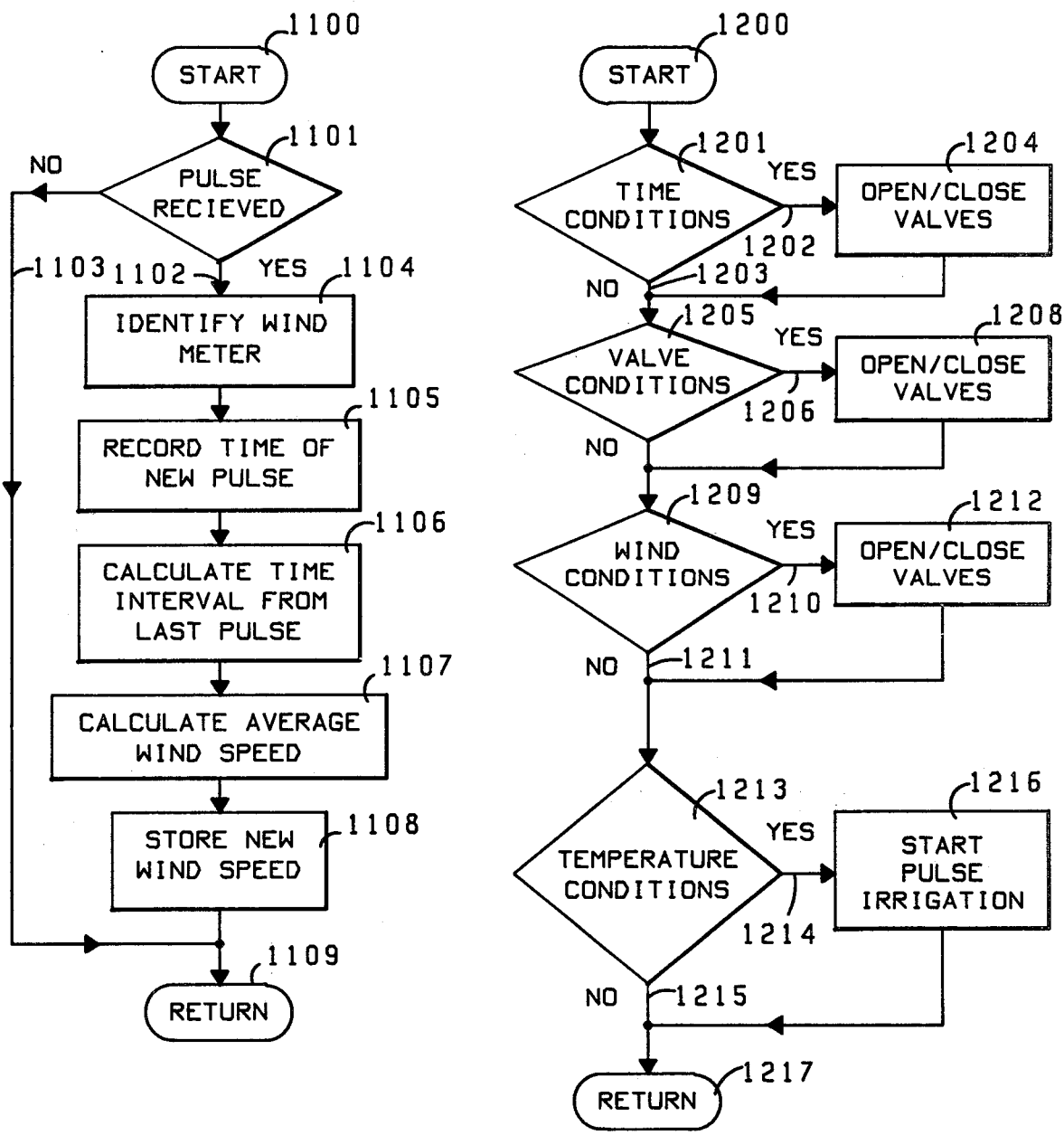
FIG. 11 is a flow chart of the wind speed sub-program for the computer of the central control station of FIG. 1.
FIG. 12 is a flow chart of the field conditions subprogram for the computer of the central control station of FIG. 1.

FIGS. 10, 11 and 12 provide flow charts for the flow rate, wind speed and field conditions sub-programs which are executed when called from appropriate boxes of the main irrigation program. Referring to FIG. 10, the flow rate sub-program is called from box 803 of the main irrigation program and is entered at start box 1000. Proceeding to decision box 1001, a check is made to see if a pulse, indicative of a predetermined quantity of water, has been received from a remote station. If a pulse has not been received from a remote station, NO branch 1003 is taken to return box 1011. Otherwise, YES branch 1002 is taken to box 1004.

In box 1004, the flow meter from which the pulse has been received is identified. Proceeding to box 1005, the totalized number of pulses from the identified flow meter is incremented. Next, at box 1006, the quantity of water corresponding to the totalized number of pulses for the identified meter is also incremented by a corresponding amount for the received pulse.

Proceeding to box 1007, the time at which the new pulse has been received is recorded for the identified meter. Next, at box 1008, the time interval between the newly received pulse and the previously received pulse is calculated. Then, at box 1009, a new flow rate for the identified meter is calculated from the time interval and the quantity of water corresponding to a pulse. Proceeding to box 1010, the newly calculated flow rate for the identified meter is stored in an appropriate table in the memory of the computer. Next, the flow rate program proceeds to return box 1011 and operation of the computer returns to the main irrigation program.

Referring to FIG. 11 the wind speed program called from box 802 of the main irrigation program is entered at start box 1100. First, at decision box 1101, a check is made to see if a pulse has been received from a wind meter in a remote station. If a pulse has not been received, NO branch 1103 is taken to return box 1109. Otherwise, YES branch 1102 is taken to box 1104.

In box 1104, the wind meter from which the pulse has been received is identified. Next, the time at which the new pulse has been received from the identified wind meter is recorded in box 1105. Proceeding to box 1106, the time interval between the newly received pulse and the previously received pulse is calculated. Next, at box 1107, the average wind speed for the identified wind meter is calculated from the previously received pulses and the time interval therebetween. For example, the instantaneous wind speed is calculated from the time interval between the last two pulses and the distance equivalent to each pulse. An average wind speed can be calculated by averaging over a number of calculated instanteous wind speeds. Proceeding to box 1108, the calculated average wind speed for the identified wind meter is stored in the memory of the computer. Next, the wind speed program proceeds to return box 1109 for returning control of the computer to the main irrigation program.

Pressure meters providing pulse outputs may also be processed by sub-program similar to that of the wind speed sub-program of FIG. 11.

The field conditions sub-program of FIG. 12 is called from box 804 of the main irrigation program and is entered at start box 1200. Proceeding to decision 1201, time conditions which may be specified for controlling the operation of various valves are checked. If any of the time conditions are satisfied, YES branch 1202 is taken to box 1204 where corresponding valves are opened or closed. The irrigation operation of a valve may be specified to start at a given time, and the irrigation operation may be specified to stop at a specific time. Otherwise, NO branch 1203 is taken to decision box 1205.

In decision box 1205, valve conditions, which may set forth a desired sequence of operation of a group of valves, are checked. If a particular valve condition is found, YES branch 1206 is taken to box 1208. In box 1208, specific valves are opened or closed in response to the corresponding valve conditions. For example, valve No. 19 may be scheduled to open when valve No. 18 closes. Thus when a pre-established quantity of water has been delivered to valve No. 18, the irrigation operation of valve No. 19 will be initiated. Otherwise, NO branch 1207 is taken to decision box 1209.

In decision box 1209, wind conditions in the agricultural area are checked. If the wind speed exceeds a predetermined wind speed, YES branch 1210 is taken to box 1212. In box 1212, the valves in the agricultural area are closed to prevent rapid evaporation of the water due to the high wind speeds. When the wind subsides, the valves will be opened again and the irrigation operation will be continued. Otherwise, No branch 1211 is taken to decision box 1213.

Proceeding to decision box 1213, if temperature conditions below a predetermined minimum temperature are detected in the agricultural area, YES branch 1214 is taken to box 1216. In box 1216, the irrigation operation of the various valves in the water distributing system are operated in a pulse irrigation mode for preventing cold temperature damage to the crops by applying warm water, warm water being water whose temperature is above the freezing point. The pulse irrigation mode successively opens the various valves for short periods of time to apply warm water over the entire agricultural area. The warmth and frequent application of the water prevent cold temperature damage to the crops.

The pulse irrigation mode may also be organized to distribute pre-established quantities of warm water over the entire agricultural area that is sufficient to prevent cold temperature damage to the crops. The pre-established quantity distributed at predetermined time intervals is only that quantity of water necessary to protect the crops, thereby minimizing the waste of water resources. The quantity of water and repetition rate can be varied depending on the particular crop and cold temperature conditions.

If temperature conditions are not satisfied, NO branch 1215 is taken to return box 1217 to return control of the computer to the main irrigation program.

Many other conditions may be incorporated into the field-conditions sub-programs to accommodate the particular requirements of an agricultural area. In addition, pressure sensors and alarm conditions such as booster pump alarms may also be accommodated by the field conditions sub-program.

The foregoing embodiments have been intended as illustrations of the principles of the present invention. Accordingly, other modifications, uses and embodiments can be devised by those skilled in the art without departing from the spirit and scope of the principles of the present invention.

What is claimed is:

1. A system for irrigating an agricultural area comprising:
   means for distributing water to the agricultural area from a water source;
   main valve means for controlling the flow of water from the water source to said distributing means;
   main metering means for measuring the quantity of water flowing from said main valve means to said distributing means and providing an output pulse each time that a predetermined quantity of water flows past the main metering means; and
   automatic control means including means for opening the main valve means to allow the water to flow from the water source to said distributing means, means for totallizing the output pulses from said main metering means to provide a measured quantity of water distributed to the agricultural area, and means for closing the main valve means when the measured quantity of water is substantially the same as a pre-established quantity of water for the agricultural area.

2. The irrigation system according to claim 1, including a booster pump for pumping water from the water source to said main valve means and a water pressure sensor for sensing the pressure of the water flowing from said main valve means to said distributing means and providing a low pressure indication when the sensed water pressure is less than a predetermined water pressure, said automatic control means including means for activating the booster pump in response to the low pressure indication for building up the water pressure.

3. The irrigation system according to claim 1, wherein said automatic control means includes means for controlling the opening and closing of said main valve means to control the quantity of water applied to the agricultural area to suit the particular agricultural area and environmental conditions.

4. The irrigation system according to claim 1, wherein said automatic control means includes means for scheduling the operation of said main valve means at a predetermined time.

5. The irrigation system according to claim 1, wherein the agricultural area produces a crop, said automatic control means including means for scheduling the operation of said main valve means at time intervals in accordance with the growing cycle of the crop.

6. The irrigation system according to claim 1, wherein said automatic control means includes means for repetitively enabling the operation of said main valve means for maintaining a pre-established moisture level in the soil of the agricultural area.

7. The irrigation system according to claim 1, wherein said automatic control means includes a computer having a stored program therein for providing control functions.

8. A system for irrigating an agricultural area comprising:
   means for distributing water to the agricultural area from a water source;
   main valve means for controlling the flow of water from the water source to the distributing means;
   main metering means for measuring the quantity of water flowing from the main valve means to the distributing means and providing an output pulse each time that a predetermined quantity of water flows past the main metering means; and
   automatic control means including means for opening the main valve means to allow the water to flow from the water source to the distributing means, means for calculating the flow rate from the elapsed time between successive output pulses from the main metering means, and means for closing the main valve means when the distributed quantity of water measured by the main metering means is substantially the same as a pre-established quantity of water for the agricultural area.

9. The irrigation system according to claim 8, wherein said automatic control means includes means for comparing the calculated flow rate to a pre-established maximum flow rate and closing said main valve means and providing an alarm indication signal when the calculated flow rate is greater than the pre-established maximum flow rate.

10. The irrigation system according to the claim 8, wherein said automatic control means includes means for comparing the calculated flow rate to a pre-established minimum flow rate and closing said main valve means and providing an alarm indication signal when the calculated flow rate is less than the pre-established minimum flow rate.

11. The irrigation system according to claim 8, wherein said automatic control means includes means for providing an alarm indication signal when the flow rate is substantially zero.

12. The irrigation system according to claim 8, wherein said automatic control means includes means for totalizing the output pulses from said main metering means to provide the measured quantity of water distributed to the agricultural area.

13. The irrigation system according to claim 8, wherein said automatic control means includes a computer having a stored program therein, the stored program including a first subprogram for receiving the output pulses from the main metering means, recording the time when the output pulses are received, and calculating the flow rate from the elapsed time between successive received output pulses.

14. The irrigation system according to claim 13, wherein the stored program of the computer includes a second subprogram for totalizing the received output pulses, converting the totalized output pulses into a totalized quantity of water and closing the main valve means when the totalized quantity of water is substantially the same as the pre-established quantity of water for the agricultural area.

15. The irrigation system according to claim 13, wherein the stored program of the computer includes a third subprogram for comparing the calculated flow rate to a predetermined range of allowable flow rates and providing an alarm indication when the calculated flow rate is not in the predetermined range of allowable flow rates.

16. A system for irrigating an agricultural area comprising:
means for distributing water to the agricultural area from a water source;
main valve means for controlling the flow of water from the water source to said distributing means;
means for dispensing a pre-established quantity of chemical into the water flowing between said main valve means and said distributing means;
main metering means for measuring the quantity of water flowing from said main valve means to said distributing means; and
automatic control means including means for opening the main valve means to allow the water to flow from the water source to said distributing means, means for activating the chemical providing means a predetermined time interval after the main valve means is opened, means for deactivating the chemical providing means when the pre-established quantity of chemical has been dispensed, and means for closing the main valve means when the distributed quantity of water measured by the main metering means is substantially the same as a pre-established quantity of water for the agricultural area.

17. The irrigation system according to claim 16, wherein said automatic control means closes said main valve at least a predetermined minimum time interval after said chemical dispersing means is deactivated.

18. The irrigation system according to claim 16, wherein said chemical providing means includes a chemical source, a hydraulic pump for dispensing the chemical from the chemical source into the water flowing to said distributing means, pump valve means for activating the hydraulic pump, and chemical metering means for measuring the quantity of chemical dispensed into the water; said automatic control means including means for opening the pump valve means to activate the hydraulic pump for dispensing the chemical from the chemical source into the water and closing the pump valve means when the quantity of chemical measured by the chemical metering means is substantially the same as the pre-established quantity of chemical.

19. The irrigation system according to claim 18, wherein the chemical metering means includes means for providing an output pulse each time that a predetermined quantity of chemical flows past the chemical metering means, said automatic control means including means for totalizing the output pulses from the chemical measuring means to provide the measured quantity of chemical dispensed into the water.

20. A system for irrigating an agricultural area having a plurality of agricultural fields for producing different kinds of crops, said irrigation system comprising:
communication means;
a plurality of remote stations, each remote station having first control means for receiving via the communication means start and stop messages for controlling the distribution of water from a water source to at least one of the fields, receiving via the communication means interrogate messages, and sending via the communication means in response to each received interrogate message a status message representing the quantity of water that has been distributed since the previously received interrogate message; and
a central control station having second control means for sending via the communication means the start message to enable selected ones of the remote stations to start distributing water continuously, sending via the communication means the interrogate message to each remote station for enabling the remote stations to send the status message, receiving via the communication means the status messages from the interrogated remote stations, totalizing the distributed quantity of water for each of the remote stations as indicated by the corresponding received status messages, and sending via the communication means the stop message to enable selected ones of the remote stations to stop distributing water when the totalized quantity of water distributed by the remote station is substantially the same as a pre-established totalized quantity of water for that remote station.

21. The irrigation system according to claim 20, wherein said second control means includes means for sending via the communication means the interrogate message to each of the remote stations in succession, the successive interrogate messages being separated by a predetermined time interval during which the corresponding status messages are sent by the interrogated remote stations.

22. The irrigation system according to claim 21, wherein said second control means includes means for queuing the start and stop messages and sending via the communication means the queued start and stop messages after receiving status messages and before interrogating succeeding remote stations.

23. The irrigation system according to claim 20, wherein the messages are digital messages, each having a predetermined number of binary bits, that are coded according to frequency-shift keying (FSK), and the central control station and remote stations include encoder/decoder means for coding and decoding the FSK coded messages.

24. The irrigation system according to claim 23, wherein the communication means is a radio channel, and the central control station and remote stations include a radio transceiver for transmitting and receiving via the radio channel the FSK coded messages.

25. The irrigation system according to claim 23, wherein the communication means is a three-wire circuit, all remote stations being transformer coupled in parallel to the three-wire circuit from the central control station, the first and second wires carrying AC power from the central control station to the remote stations, and the FSK coded messages being longitudinally impressed between the third wire and the first and second wires.

26. A system for irrigating an agricultural area, comprising:
means for distributing water to the agricultural area from a water source;

main valve means for controlling the flow of water from the water source to said distributing means;

main metering means for measuring the quantity of water flowing from said main valve means to said distributing means and providing an output pulse each time that a predetermined quantity of water flows past the main metering means; and automatic control means for opening said main value means when the ambient temperature in the agricultural area is below a predetermined minimum temperature and closing said main valve means in response to the output pulse from said main metering means for applying a predetermined quantity of water to the agricultural area as measured by said main metering means to prevent cold temperature damage to the agricultural area.

27. A system for irrigating an agricultural area having a plurality of agricultural fields for producing different kinds of crops, said irrigation system comprising:

communication means;

a plurality of remote stations, each remote station having first control means for receiving via the communication means start and stop messages for controlling the distribution of water from a water source to at least one of the fields, measuring the quantity of water distributed, and sending via the communication means a status message for each predetermined quantity of water measured; and a central control station having second control means for sending via the communication means the start message to enable selected ones of the remote stations to start distributing water continuously, receiving via the communication means the status messages from the remote stations, totalizing the measured quantity of water for each of the remote stations as indicated by the corresponding received status messages, and sending via the communication means the stop message to enable selected ones of the remote stations to stop distributing water when the totalized quantity of water distributed by the remote station is substantially the same as a pre-established totalized quantity of water for that remote station.

28. The irrigation system according to claim 27, wherein the second control means includes means for sending via the communication means an interrogate message to selected ones of the remote stations, the first control means of the selected remote stations receiving via the communication means the interrogate message and sending via the communication means in response to the received interrogate message the status message.

29. A system for irrigating an agricultural area having a plurality of fields for producing different kinds of crops, said irrigation system comprising:

for each of the agricultural fields:

(a) main distributing means for distributing water to the field from a water source, said main distributing means further including a plurality of secondary distributing means, each secondary distributing means for distributing water to a portion of the field;

(b) main valve means for controlling the flow of water from said water source to said main distributing means, said main valve means further including a plurality of secondary valve means interposed between the main valve means and corresponding ones of the secondary distributing means for controlling the flow of water to the corresponding portions of the field; and (c) main metering means for measuring the quantity of water flowing from said main valve means to said main distributing means and providing an indication for each predetermined quantity of water flowing; and automatic central control means for opening selected main valve means and opening selected corresponding secondary valve means thereafter, closing the open secondary valve means when the distributed quantity of water measured by the corresponding main metering means is substantially the same as a preestablished quantity of water for the corresponding portions of each field, totalizing the measured quantity of water distributed in the respective portions of each field, and closing the open main valve means when the totalized quantity of water is substantially the same as the pre-established quantity of water for each field.

30. A system for irrigating an agricultural area having a plurality of fields for producing different kinds of crops, said irrigation system comprising:

for each of the agricultural fields:

(a) main distributing means for distributing water to the field from a water source;

(b) main valve means for controlling the flow of water from said water source to said main distributing means; and (c) main metering means for measuring the quantity of water flowing from said main valve means to said main distributing means and providing an output pulse each time that a predetermined quantity of water flows past the main metering means; and automatic central control means for opening selected ones of the main valve means of the fields, totallizing the output pulses from each of the respective main metering means to provide a measured quantity of water distributed to each field, and closing ones of the open main valve means when the measured quantity of water is substantially the same as a pre-established quantity of water for each field.

* * * * *

UNITED STATES PATENT AND TRADEMARK OFFICE
CERTIFICATE OF CORRECTION

PATENT NO. : 4,209,131  
DATED : June 24, 1980  
INVENTOR(S) : BARASH ET AL.

It is certified that error appears in the above-identified patent and that said Letters Patent are hereby corrected as shown below:

In the Abstract

Line 1, "A" should be -- An --.

Col. 1, line 38, "computercontrolled" should be -- computer-controlled --.

Col. 2, line 2, "problens" should be -- problems --.

Col. 3, line 1, "black" should be -- block --.

Col. 3, lines 1 and 2, "computercontrolled" should be computer-controlled --.

Col. 3, line 13, "lihne" should be -- line --.

Col. 5, line 60, "be" should be -- have --.

Col. 6, line 2, "stream" should be -- system --.

Col. 6, line 4, "gum" should be -- gun --.

Col. 6, line 6, "are" should be -- each --.

Col. 6, line 8, insert -- ,the -- after "it".

Col. 6, line 9, insert -- on -- after "mounted".

Col. 6, line 17, "21" should be -- 201 --.

Col. 7, line 49, "809" should be -- 709 --.

UNITED STATES PATENT AND TRADEMARK OFFICE
CERTIFICATE OF CORRECTION

PATENT NO. : 4,209,131

DATED : June 24, 1980

INVENTOR(S) : BARASH ET AL.

It is certified that error appears in the above-identified patent and that said Letters Patent are hereby corrected as shown below:

Col. 8, line 22, "throughly" should be -- thoroughly --.

Col. 11, line 17, "no" should be -- NO --.

Col. 12, line 14, "instanteous" should be -- instantaneous --.

Col. 12, line 53, "No" should be -- NO --.

Col. 17, line 8, "value" should be -- valve --.

Signed and Sealed this

Twenty-eighth Day of April 1981

[SEAL]

Attest:

RENE D. TEGTMEYER

Attesting Officer

Acting Commissioner of Patents and Trademarks